Jan. 26, 1926. 1,570,746
J. M. JACKSON
SHACKLE BOLT AND SPRING LUBRICATING MEANS
Filed Feb. 7, 1925
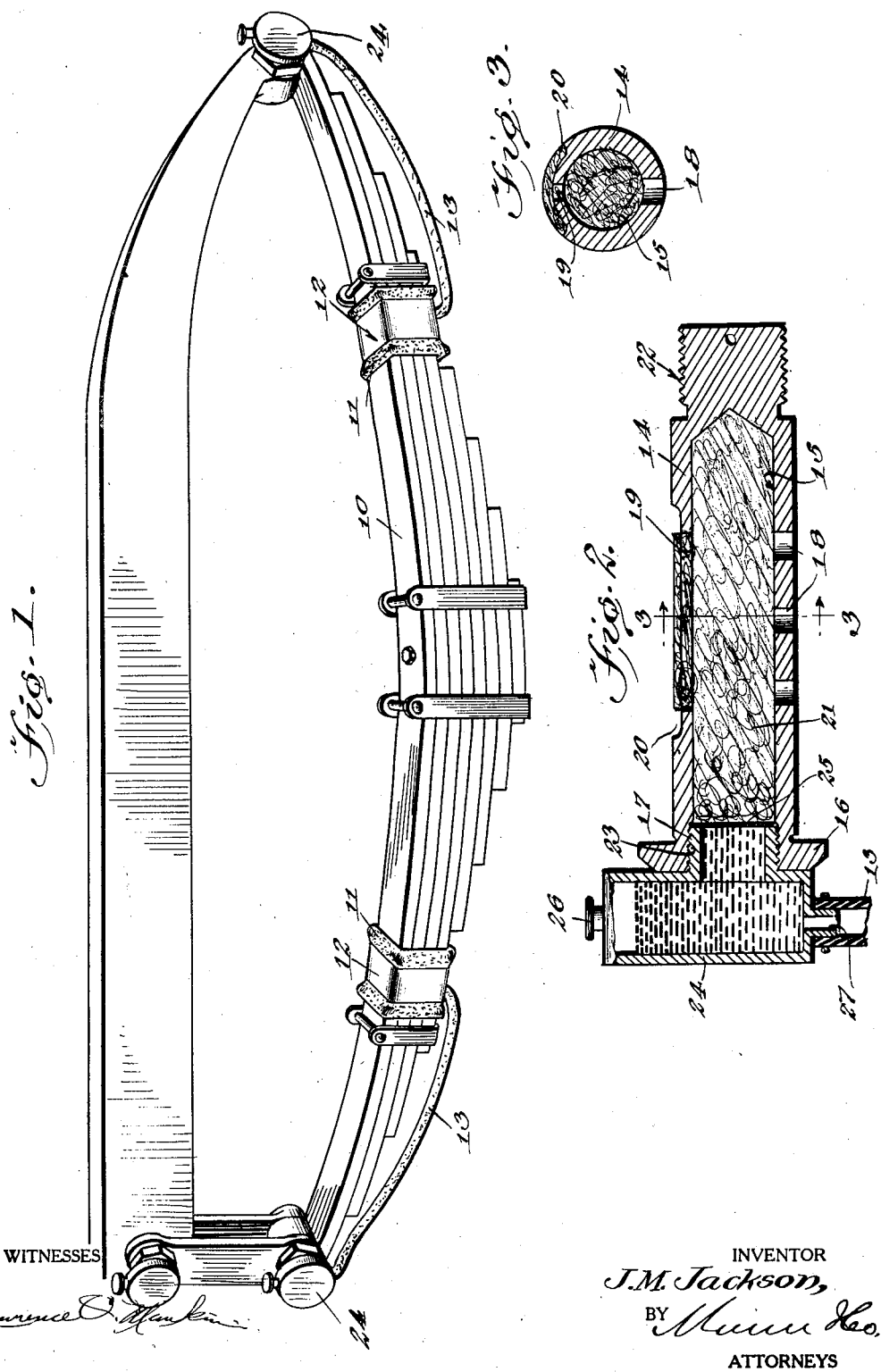
WITNESSES
INVENTOR
J. M. Jackson,
BY
ATTORNEYS Patented Jan. 26, 1926.

1,570,746

UNITED STATES PATENT OFFICE.

JAMES MADISON JACKSON, OF PARKERSBURG, WEST VIRGINIA.

SHACKLE-BOLT AND SPRING LUBRICATING MEANS.

Application filed February 7, 1925. Serial No. 7,606.

*To all whom it may concern:*

Be it known that I, JAMES MADISON JACKSON, a citizen of the United States, and a resident of Parkersburg, in the county of Wood and State of West Virginia, have invented certain new and useful Improvements in Shackle-Bolt and Spring Lubricating Means, of which the following is a specification.

My present invention relates generally to automobile springs, and more particularly to lubricating device adaptable to the shackle bolts and spring leaves, my object being the provision of a simple effective and practical arrangement whereby not only the springs, but the shackle bolts of the springs may be lubricated at all times.

In the accompanying drawing illustrating my present invention and forming a part of this specification, Figure 1 is a perspective side view of a spring and shackle bolts illustrating the application of my invention thereto, Figure 2 is an enlarged sectional view taken along one of the shackle bolts, showing its construction as proposed by my invention, and Figure 3 is a cross section through the shackle bolt taken on line 3—3 of Figure 2.

Referring now to these figures and particularly to Figure 1, I have shown a vehicle spring generally indicated at 10, provided with lubricating devices for the spring leaves consisting generally of wrappings of felt or other absorbent material as at 11, held in place by thin embracing bands 12, each of the latter of which according to my present improvements, provides for the attachment thereto of one end of a flexible tube 13, forming a conduit for a fluid lubricant, the connection of such conduit to the bands 12 being so made as to permit of direct communication between the adjacent end of the respective tube and the wrapping 11.

In further accordance with my invention each of the shackle bolts, one of which is most plainly seen in Figure 2, and indicated generally at 14, has an axial bore 15 extending therein from its headed end 16, and opening through the head 16 where the bolt is internally threaded as at 17 within the outer end of the bore. The wall of the bolt also has openings 18 therethrough from the lower portion of the bore and a slot 19 through the upper portion, the slot opening into a shallow groove 20 so that a portion of the loose absorbent packing 21 with which the bore 15 is filled, may protrude through the slot 19 and into the groove 20 and in this way against the inner surface of the bearing through which the shackle bolt extends.

At its opposite end the shackle bolt is reduced and externally threaded as at 22 in the usual manner for the reception of a locked retaining nut.

The internal threads 17 of the shackle bolt at the outer end of its bore 15 adapt the same for the reception of the laterally projecting externally threaded nipple 23 of a lubricant holder 24 which, by this means, is firmly positioned at the headed end of the bolt, the nipple 23 opening directly into the bore 15 of the shackle bolt and preferably having a reticulate plate 25 across its open end to prevent the absorbent material 21 within the bore 15 from passing into the holder 24 with the possible effect of preventing proper feed of lubricant.

The lubricant holder 24 has an upper filling cap 26 and is provided at its lower end with a depending nipple 27 to which the outer end of one of the flexible tubes or conduits 13 is attached so that it is thus apparent that each lubricant holder 24 constitutes a common source of lubricant for both its respective shackle bolt and one of the lubricant applying devices of the spring itself, through one of the tubes 13, irrespective of the particular nature of the applying devices which I have in the present instance indicated as bands or wrappings of absorbent material around and attached to the spring.

My invention is thus simple and inexpensive and of a highly practical nature, and will not only be lasting and durable in use, but will be effective and efficient without other requirement than that the holders 24 be supplied from time to time with a fluid lubricant.

I claim:—

A spring lubricating device including a spring encircling layer of absorbent material, a confining band surrounding and holding said material in place, a flexible lubricant supply tube connected at one end to the lower portion of said confining band, and a lubricant holder having a threaded nipple at one side adapting the same for connection to a shackle bolt of the spring, and also having a depending nipple to which the other end of said tube is connected.

JAMES MADISON JACKSON.